Nov. 30, 1937.　　　　I. H. JUDD　　　　2,100,694
SKID CARRIER FOR MOTOR VEHICLE TRANSPORTS
Filed April 27, 1936　　　3 Sheets-Sheet 1
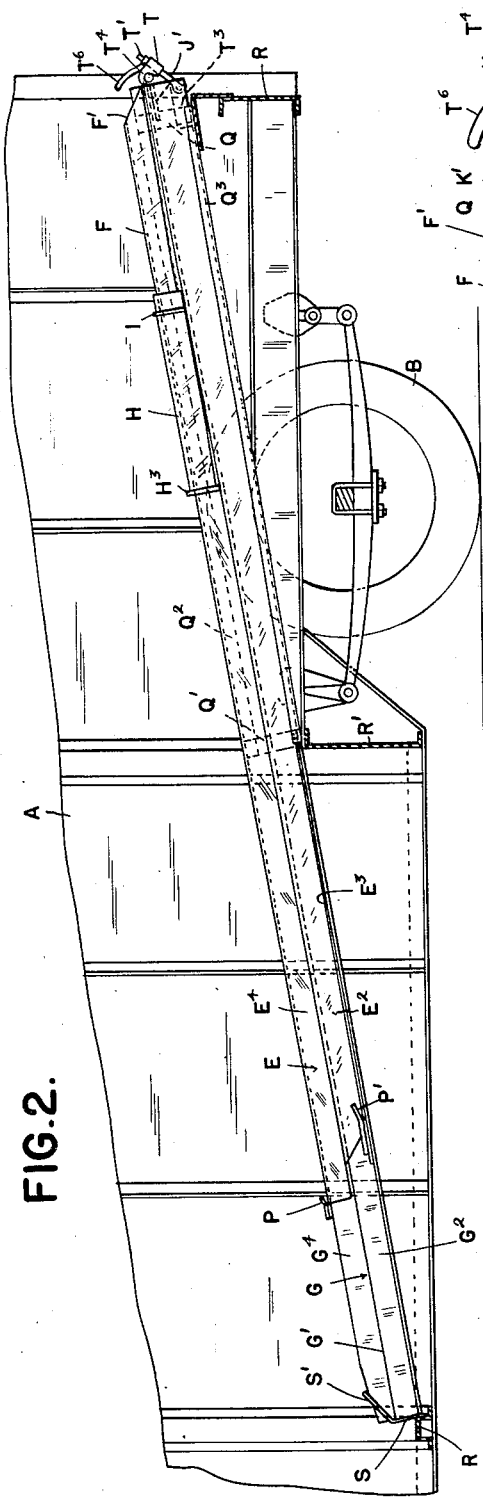
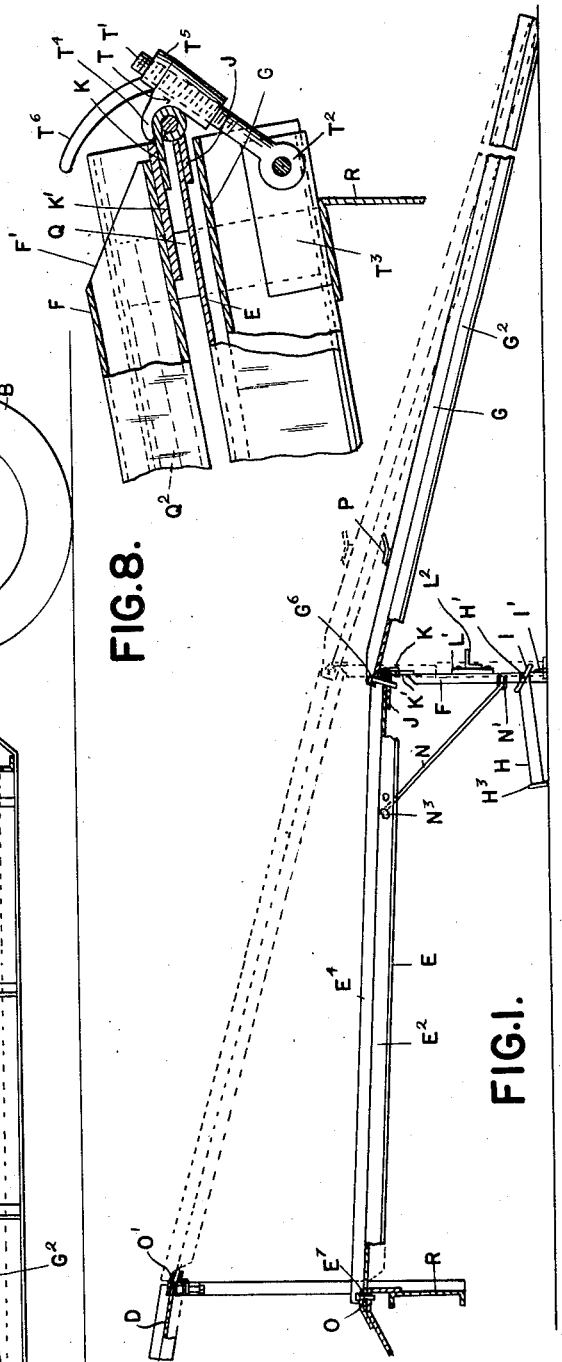
INVENTOR
IRVING H. JUDD
BY *Whittemore Hulbert*
　*Whittemore & Belknap*
ATTORNEYS

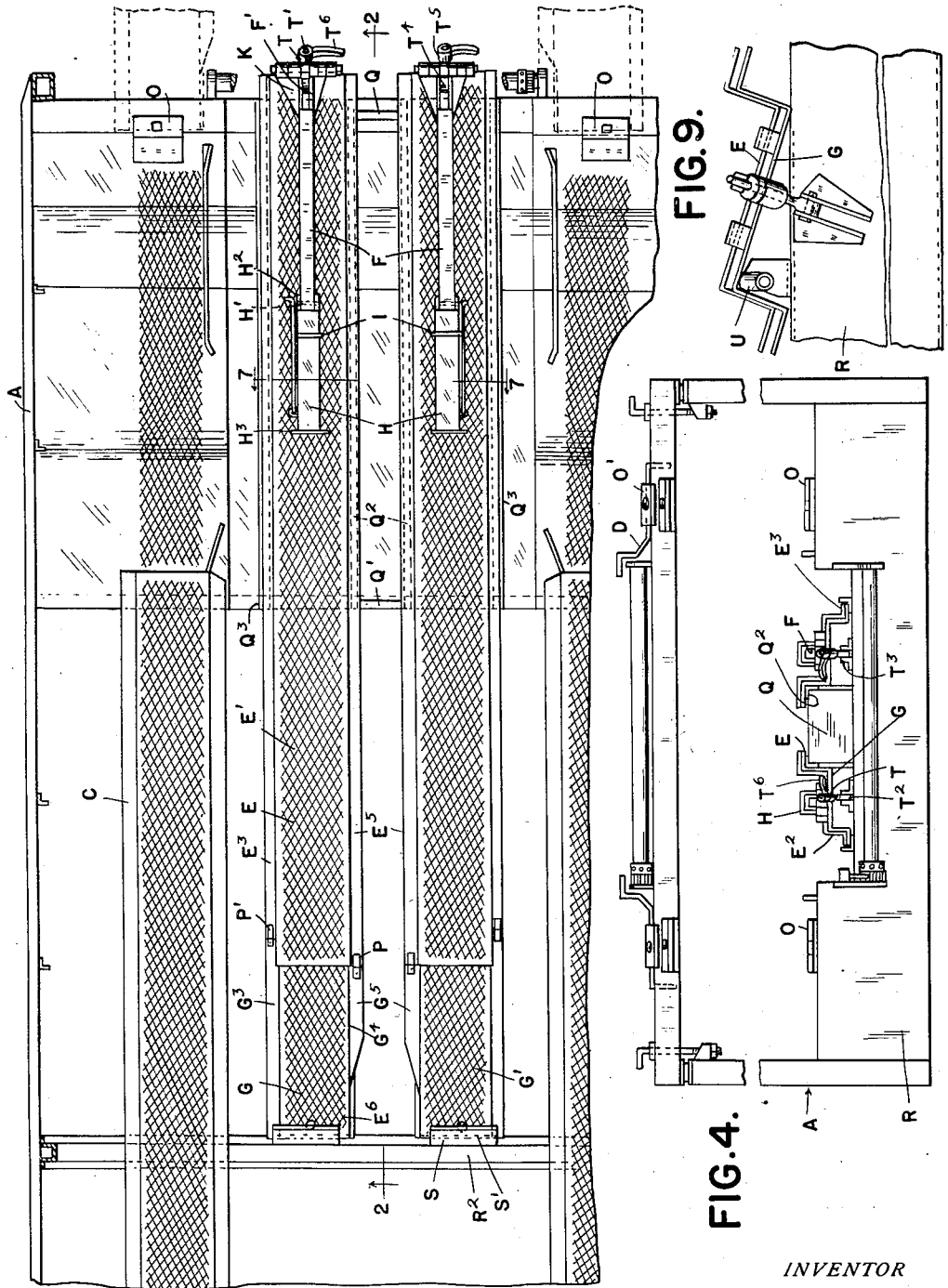

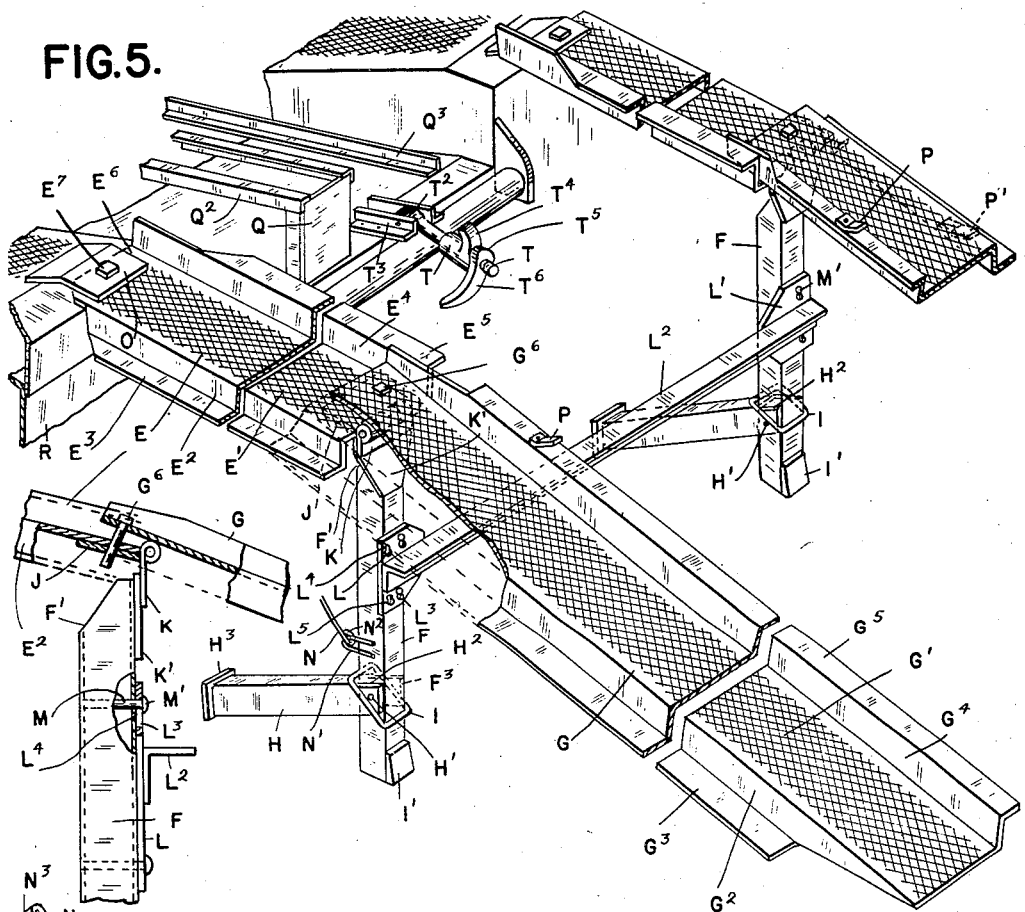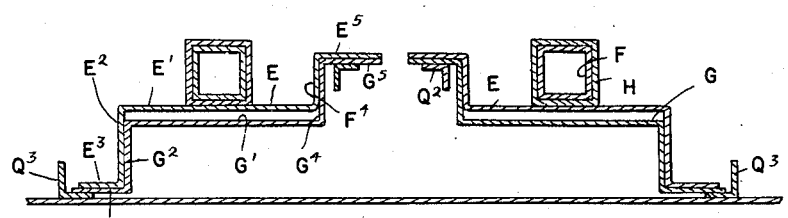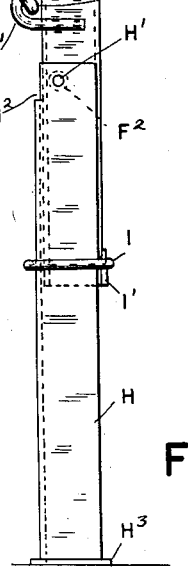

Patented Nov. 30, 1937

2,100,694

UNITED STATES PATENT OFFICE 2,100,694

SKID CARRIER FOR MOTOR VEHICLE TRANSPORTS

Irving H. Judd, Dearborn, Mich., assignor to Whitehead & Kales Company, River Rouge, Mich., a corporation of Michigan Application April 27, 1936, Serial No. 76,716

22 Claims. (Cl. 214—85)

The invention relates to skids designed for use in connection with motor vehicle transports for loading and unloading the cars thereon. In the present state of the art, motor vehicle transports have been constructed in the form of motor truck trailers on which the vehicles to be transported are stored in either a single or a double tier. It is, however, necessary to provide means for loading the vehicles onto the trailer which is usually accomplished by skids. Furthermore, as it is necessary to unload the vehicles at their destination, these skids when not in use are stored and carried on the transport. A serious difficulty encountered with this arrangement is the noise that is produced when the skids are loosely stored on the transport. This is due to the fact that such skids are usually formed of metal and in a number of parts which will rattle around unless securely fastened.

It is the object of the present invention:

First, to obtain a skid construction adapted for use in loading and unloading both the lower and the upper tier of cars;

Second, to obtain a construction which can be easily adjusted for use and which when not in use can be easily and quickly stored on the transport and securely held against rattling.

With these objects in view, the invention consists in the construction of the skid and the holding means therefor, as hereinafter set forth.

In the drawings:

Figure 1 is a sectional side elevation showing in full lines the skid in position for loading cars in the lower tier and in dotted lines for loading the upper tier;

Figure 2 is a longitudinal section through a portion of the transport on line 2—2 of Figure 3 showing the skid in stored position;

Figure 3 is a plan view of Figure 2;

Figure 4 is a rear elevation of the transport;

Figure 5 is a perspective view showing the skid in engagement with the lower tier tracks;

Figure 6 is a sectional elevation showing the extensible supporting leg for the skid;

Figure 7 is a cross-section on line 7—7 of Figure 3;

Figure 8 is an enlarged sectional elevation showing the means for clamping the skid in stored position;

Figure 9 is a view similar to a portion of Figure 4 showing a modification.

The motor vehicle transport A is of any suitable construction being provided with supporting wheels B, lower track C on which the vehicles are to be driven and, if desired, elevated tracks D for an upper tire of cars. My improved skid is adapted for loading cars on either the lower or the upper tracks and is of the following construction:

E is a track section which extends rearward from the rear end of the vehicle. F is a leg hingedly connected to the rear end of the section. E and G is a second track section which extends from the leg supported rear end of the section E to the ground. To adapt the skid for connection with either the lower or the upper tier of tracks, the leg F is extensible, preferably by providing it with a lower section H pivotally attached to the upper section. The two sections overlap each other and in extended position are held rigid by a coupling ring I.

More in detail, the track section E is preferably formed of a pressed sheet metal member having a tread portion E', a down-turned flange $E^2$ at the outer side thereof terminating in a horizontally extending flange $E^3$ and an up-turned flange $E^4$ at the inner side terminating in a horizontally extending flange $E^5$. The track section G is similarly formed with a tread portion G', a down-turned flange $G^2$ terminating in a horizontally extending flange $G^3$ and an upwardly extending flange $G^4$ at the inner side terminating in a horizontally extending flange $G^5$. The section E has secured to its rear end the hinge bracket J which is engaged by a hinge bracket K secured to the upper end of the leg F. This leg is preferably formed of a rectangular box section which is obliquely cut away at its upper end as indicated at F'. The hinge bracket K is secured to the uncut side through the medium of a gusset plate K', these parts being secured to each other by welding. The lower section H of the leg is formed of a channel bar embracing the section F and secured thereto by a pivot pin H' which passes through a tubular bushing $F^2$ in the member F. The web of the member H is cut away at $H^2$ so as to permit of swinging on the pivot to a position substantially at right angles to the member F. The member H is also provided with a bottom plate $H^3$ secured thereto preferably by welding. The portions of the members F and H which overlap each other are held in alignment when the leg is extended by the ring I above referred to. This is fashioned to fit about the two members and is held in its lower position by engaging a stop I' on one side of the member F. Thus, when the leg is extended and locked by the ring I, it will be of sufficient length to support the rear end of the member E when its forward end is in engagement with the upper track of the transport. While in its collapsed or folded position the leg is of the proper height for supporting the member E when in engagement with the lower track.

The construction as above described is duplicated for the second track and rigidity is imparted to the pair by a cross-brace between the legs. This brace comprises a pair of gusset plates L and L' which are connected to each other by a bar $L^2$ preferably of angle cross-section. The gusset plates are provided with apertures $L^3$ for engaging the headed pins M on the leg section F. The apertures $L^3$ are arranged at the top and the bottom of each gusset plate being of a diameter to permit the head M' of the pin M to pass therethrough and being provided with the upwardly extending slots $L^4$ for engaging the shank of the pin to permit locking with the head. Both of the legs F are provided with the pins M and the length of the bar $L^2$ is such as to produce the proper spacing between the tracks. Preferably one of the gussets is provided with a second set of apertures $L^5$ for engagement with the pins in case a wider spacing of the tracks is desired.

To provide further rigidity to the skid folding brace members N are secured to each leg. As shown, the leg sections F have secured thereto a U-shaped member N' having the return-bent portion extending laterally beyond the side of the leg. The member N has an eye $N^2$ for engaging this return-bent portion, while at its opposite end the member N has a hook portion $N^3$ for engaging the member E and forming a diagonal brace between the same and the leg.

When the skids are placed in position for use the forward ends of the members E are connected with either the lower tracks C or the upper tracks D. To provide for this attachment the forward end of the member E has secured thereto a tongue $E^6$ which extends at a slightly oblique angle and engages a bifurcated clevis O on the lower track C or a similar bifurcated clevis O' on the upper track D. A pin $E^7$ extends through aligned apertures in this clevis and in the tongue $E^6$ and thus securely locks these members to each other. The member G at its forward end slightly overlaps the member E and is secured thereto by a pin $G^6$ engaging registering apertures in the two members.

From the description above, it will be understood that the skid may be readily adjusted for loading cars on either the lower or the upper tracks of the transport. It is, however, necessary to carry the skids with the transport as they are required for unloading. To permit of this and to hold the members from rattling during transit, I have devised the following construction:

The hinge connection between the section E and leg F permits of folding the latter over the former so as to lie parallel thereto. The section E is shorter than the section G but is of the same cross-sectional form so that the two can be placed in parallelism. They are then clamped to each other by providing on the section G bracket clip members P and P', these being arranged respectively upon the flanges $G^5$ and $G^3$ so as to engage the forward end of the shorter member E. The tracks C on the transport are spaced a sufficient distance from each other to provide storage space for both right and left skid members, these being respectively arranged to the right and left of the center of the vehicle. As shown, a post Q is arranged at the center and at the rear end of the transport being secured to the cross-member R of the frame. A similar post Q' is mounted on the cross-member R' which is forward of the cross-member R and at a lower level. These posts are connected by rails $Q^2$ preferably angle bars extending therebetween and similar angle bar rails $Q^3$ extend from between the cross members R and R' for engaging the lower outwardly extending flanges $E^3$ and $G^3$ of the skid members. A third cross-member $R^2$ of the transport is located to form a stop for the forward end of the long skid member G, and an angle bracket S is attached to this member being provided with an oblique portion S' for engaging the tread portion G' and drawing it downward. At the rear end of the transport is an adjustable clamp T having a threaded shank T' with an eye $T^2$ pivotally secured to a bifurcated bracket member $T^3$. There is also a hook member $T^4$ sleeved upon the shank T' and a clamping nut $T^5$ with an operating handle $T^6$. The arrangement is such that the hook member $T^4$ may be engaged with the hinge bracket connecting the member E with the leg F and by then tightening the nut $T^5$ by means of the handle $T^6$ all of the parts will be clamped to each other and to the supporting bars therefor.

In Figure 9 I have shown a modification in which the skid sections are obliquely arranged when clamped in the holder. Thus as shown, the tread portion is obliquely inclined in cross-section so that the upwardly extending flange is no higher than the downwardly extending flange. This will give a greater clearance between the stored skids and the automobile that is placed thereover. Also, with this construction instead of supporting the upper laterally extending flange of the skid on the rail $Q^2$, a rail U is arranged to engage the skid section in the corner between the tread portion and the downwardly extending flange, otherwise the construction is similar to that previously described.

What I claim as my invention is:

1. A collapsible skid for motor vehicle transports comprising a track member attachable at its forward end to the rear end of the track on the transport, a leg member hingedly secured to the rear end of said track member and having a foldable extension, said leg and extension being selectively engageable with the ground to support the track member and a separate track member detachably connected at its forward end to said first track member and leg and extending therefrom to the ground or pavement.

2. A collapsible skid for motor vehicle transports having lower and upper tracks for the storage of cars in tiers, said skid comprising a track member adapted for connection at its forward end with the rear ends of either lower or upper tracks, a leg hingedly secured to the rear end of said track member to support the same at a proper height when engaged with the lower track of the transport, said leg having a foldable extension for similarily supporting said track member when engaged with the upper track of the transport, and a separate track member adapted for connection with the rear end of said first mentioned track member in either of its positions of adjustment and extending therefrom to the ground.

3. A collapsible skid for motor vehicle transports having lower and upper tracks for the storage of cars in tiers, said skid comprising a track member adapted for connection at its forward end to the rear end of either lower or upper tracks on said transport, a leg hingedly connected to the rear end of said track member and of a length to support the latter at proper elevation when its forward end is engaged with the lower track of the transport, said leg having a foldable extension adapted when aligned therewith to support said track member at proper height for engagement of its forward end with the upper track of the transport, means for rigidly locking said foldable extension in aligned position, and a separate track member adapted for engagement with the rear end of said first mentioned track member in either of its positions of adjustment and extending therefrom to the ground or pavement.

4. A skid for motor vehicle transports having lower and upper tracks for the storage of cars in tiers, said skid comprising a pair of track members adapted for engagement at their forward ends with the rear ends of either the lower or upper tracks of the transport, legs hingedly connected to the rear ends of said track members, each of said legs having a foldable extension and being so proportioned as to support said track members at proper height for engagement with the lower tracks of the transport when the extensions are folded and to support said track members when engaged with the upper tracks of the transport when said extensions are aligned with said legs, means for locking said extensions rigidly to said legs when in aligned position, and a brace extending between said legs and detachably engaged therewith to hold the members of the pair in rigid relation to each other.

5. A collapsible skid for motor vehicle transports comprising a track member engageable at its forward end with the rear end of the track on the transport, a leg member hingedly secured to the rear end of said track member and adapted to support the same, said leg having a foldable extension and being so proportioned as to support the rear end of said track member at one elevation when said extension is folded and to support the rear end of said track member at a different elevation when said extension is aligned with said leg, a brace member pivotally attached to said leg and detachably engaging said track member to form a diagonal brace therebetween, and a second track member detachably engageable at its forward end with the rear end of said first track member and extending therefrom to the ground or pavement.

6. The combination with a motor vehicle transport provided with tracks on which the cars to be transported are loaded, of a detachable skid for loading the cars on said tracks and comprising a plurality of members adapted to be arranged in parallelism when not in use, a holder on said transport for said skid, said holder having a portion forming an abutment for one end of said skid and means engageable with said skid at the other end thereof for clamping said skid against said abutment to secure all of the members from rattling.

7. The combination with a motor vehicle transport provided with tracks on which the cars to be transported are loaded, of a detachable skid for loading the cars on said tracks comprising a track member engageable at its forward end with the rear end of the track on said transport, a leg hingedly secured to the rear end of said track member, a second track member adapted to be coupled at its forward end with the rear end of said first track member and extending therefrom to the ground or pavement, a holder on said transport on which said second track member is placed, said holder having a portion forming an abutment for one end of the second track member and means engageable with said skid at the other end thereof for clamping said first track member and hinged leg to said second track member and for clamping the end aforesaid of the second track member against said abutment to secure the same from rattling.

8. The combination with a motor vehicle transport having tracks on which the cars to be transported are loaded, of a detachable skid for loading the cars on said tracks comprising a plurality of members adapted to be arranged in parallelism when not in use, one member being of greater length than another member and provided with a clip for engaging the forward end of said other member to hold the rear end thereof in substantial alignment with the rear end of the first member, a stop on said transport forming an abutment for the forward end of said first member, and forming an abutment for engaging the rear end of said second member and to clamp the forward end of the second member against said abutment and for holding both members from rattling.

9. The combination with a motor vehicle transport provided with tracks on which the cars to be transported are loaded, of a detachable skid for loading the cars on said tracks comprising a track member having upwardly and downwardly extending flanges on its opposite side terminating in lateral extensions, the forward end of the track member being adapted for coupling with the rear end of the track on said transport, a leg hingedly connected to the rear end of said track member and adapted when not in use to be folded in parallelism therewith, a second track member of similar cross-section to said first track member adapted to engage the forward end thereof with the rear end of said first track member and to extend therefrom to the ground or pavement, an inclined clip on said transport for engaging the forward end of said second track member, a clip on said second track member for engaging the forward end of said first track member when arranged in parallelism therewith, and a clamp for engaging the hinge connection between said first track member and leg when the latter is in folded position and adapted to press the forward end of the second track member in engagement with said inclined clip to hold the parts from rattling during transit.

10. The combination with a motor vehicle transport provided with tracks on which the cars to be transported are loaded, of a detachable skid for loading the cars on said tracks comprising a track member adapted to be coupled at its forward end to the rear end of the track on said transport, a leg hingedly secured to the rear end of said track member, a second track member of greater length than said first track member adapted for connecting at its forward end with the rear end of said first member and extending therefrom to the ground or pavement, a holder on said transport for engaging said second track member, a clip on said second track member for engaging the forward end of said first track member when arranged in parallelism therewith, and a clamp on said transport for engaging the hinge connection between said first track member and leg when in folded position and adapted to clamp the same in engagement with said clip and holder to secure all parts from rattling.

11. The combination with a motor vehicle transport provided with tracks on which the cars to be transported are loaded, of a detachable skid for loading the cars on said tracks comprising a track member having upwardly and downwardly extending flanges on its opposite sides terminating in lateral extensions the forward end of said track member being adapted for coupling with the rear end of the track on said transport, a leg hingedly connected to the rear end of said track member and adapted when not in use to be folded into parallelism therewith, a second track member of similar cross-section to said first track member adapted to engage the forward end thereof with the rear end of said first track member and to extend therefrom to the ground or pavement, a holder on said transport comprising a pair of rails for engaging the lateral extensions of said upper and lower flanges of said track members, an inclined clip on said transport for engaging the forward end of said second track member while engaged with the rails of said holder, and a clamp for engaging the hinge connection between said first track member and leg when the latter is in folded position and adapted to press the forward end of said second track member in engagement with said inclined clip to hold the parts from rattling during transit.

12. A skid for motor vehicle transports having lower and upper tracks for the storage of cars in tiers, said skid comprising a pair of track members adapted for engagement at their forward ends with the rear ends of either the lower or upper tracks of the transport, legs hingedly connected to the rear ends of said track members, each of said legs having a foldable extension and being so proportioned as to support said track members at proper height for engagement with the lower tracks of the transport when the extensions are folded and to support said track members when engaged with the upper tracks of the transport when said extensions are aligned with said legs.

13. A collapsible skid for motor vehicle transports, comprising a track member engageable at its forward end with the rear end of a track on the transport, a leg member hingedly secured to the rear end of said track member and adapted to support the same, said leg having a foldable extension and being so proportioned as to support the rear end of said track member at one elevation when said extension is folded and to support the rear end of said track member at a different elevation when said extension is aligned with said leg, and a second track member detachably engaged at its forward end with the rear end of the first track member and extending therefrom to the ground.

14. The combination with a motor vehicle transport provided with tracks on which the cars to be transported are loaded, of a detachable skid for loading the cars on said tracks comprising a track member, the forward end of the track member being adapted for coupling with the rear end of the track on said transport, a leg hingedly connected to the rear end of said track member and adapted when not in use to be folded in parallelism therewith a second track member adapted to engage the forward end thereof with the rear end of said first track member and to extend therefrom to the ground or pavement, an inclined clip on said transport for engaging the forward end of said second track member, a clip on said second track member for engaging the forward end of said first track member when arranged in parallelism therewith, and a clamp for engaging the hinge connection between said first track member and leg when the latter is in folded position and adapted to press the forward end of said second track member in engagement with said inclined clip to hold the parts from rattling during transit.

15. The combination with a motor vehicle transport provided with tracks on which the cars to be transported are loaded, of a detachable skid for loading the cars on said tracks comprising a track member adapted for coupling with the rear end of the track on said transport, a leg hingedly connected to the rear end of said track member and adapted when not in use to be folded into parallelism therewith, a second track member adapted to engage the forward end thereof with the rear end of said first track member and to extend therefrom to the ground or pavement, a holder on said transport comprising a pair of rails for engaging said track members, an inclined clip on said transport for engaging the forward end of said second track member while engaged with the rails of said holder, and a clamp for engaging the hinge connection between said first track member and leg when the latter is in folded position and adapted to press the forward end of said second track member in engagement with said inclined clip to hold the parts from rattling during transit.

16. The combination with an automobile transport, of a detachable skid for loading automobiles on said transport, comprising a track member having its forward end attachable to the transport, a leg hingedly connected to said track member at the rear end thereof and adapted when not in use to be folded in parallelism therewith, a second track member adapted to engage its forward end with the rear end of said first track member and to extend therefrom to the ground or pavement, an abutment on said transport for the forward end of the second mentioned track member, a clip on said second track member for engaging the forward end of the first mentioned track member when the latter is in parallelism with said second track member, and a clamp for engaging the hinge connection between said first track member and leg when the latter is in folded position and adapted to press said second track member in engagement with said abutment to hold the parts from rattling during transit.

17. The combination with an automobile transport, of means for loading automobiles onto the transport including a skid provided at its rear end with a hinged leg adapted when not in use to be folded in parallelism therewith, an abutment on said transport for the forward end of said skid, and a clamp carried by said transport for engaging the hinge connection between said skid and leg when the latter is in parallelism with the skid and adapted to press the skid in engagement with the abutment to hold the parts from rattling during transit.

18. A collapsible skid comprising a track having means at its forward end alternately attachable to the upper and lower decks of a double deck transport, and means at its rear end for supporting said track in either of said positions, including a leg secured at its upper end to said track and provided at its lower end with an extension capable of being moved into alignment with the leg for engagement with the ground when the track is in the upper position and movable out of alignment with the leg to permit the latter to engage the ground when the track is in the lower position.

19. A collapsible skid comprising a pair of laterally spaced track members provided at their forward ends with means for attachment alternately to the upper and lower decks of a double deck transport and provided at their rear ends with depending ground-engaging means capable of supporting the track members when connected to either the upper or the lower decks of the transport.

20. A collapsible skid comprising a pair of laterally spaced track members provided at their forward ends with means for attachment alternately to the upper and lower decks of a double deck transport and provided at their rear ends with depending ground-engaging means having portions for supporting the track members when connected to the upper deck of the transport and having other portions for supporting the track members when they are connected to the lower deck of the transport.

21. A collapsible skid comprising a pair of laterally spaced track members provided at their forward ends with means for attachment alternately to the upper and lower decks of a double deck transport, means carried by the track members at their rear ends engageable with the ground to support said track members when attached to the lower deck of the transport, and means carried by the means just mentioned and engageable with the ground to support said track members when attached to the upper deck of the transport.

22. A collapsible skid of the class described having laterally spaced track members attachable at their forward ends to a deck of an automobile transport, ground-engaging legs hingedly connected at their upper ends to the rear ends of said track members, and a cross brace member extending between and having detachable locking engagement with said legs.

IRVING H. JUDD.